(12) United States Patent
Bernhard et al.

(10) Patent No.: US 7,721,398 B2
(45) Date of Patent: May 25, 2010

(54) CUTTING MACHINE WITH A WORKPIECE CHANGER

(75) Inventors: Franz-Xaver Bernhard, Spaichingen (DE); Tobias Schwörer, Köngsheim (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 309 days.

(21) Appl. No.: 11/494,569

(22) Filed: Jul. 28, 2006

(65) Prior Publication Data

US 2007/0022591 A1  Feb. 1, 2007

(30) Foreign Application Priority Data

Jul. 30, 2005  (EP)  ............................ 05016638

(51) Int. Cl.
  *B23Q 7/00*  (2006.01)
(52) U.S. Cl. ............... 29/33 P; 409/134; 409/212; 409/172; 414/222.04; 414/223.01; 414/226.05; 198/346.1; 198/345.3
(58) Field of Classification Search ............. 29/33 P, 29/563, 564, 568; 409/134, 172, 212, 202, 409/159; 414/222.01, 222.04, 225.01, 223.01, 414/223.02, 226.05; 198/346.1, 346.2, 345.1, 198/345.2, 345.3; 483/14–15
See application file for complete search history.

(56) References Cited

U.S. PATENT DOCUMENTS

| | | | |
|---|---|---|---|
| 4,373,840 A | | 2/1983 | Miller |
| 4,534,093 A | * | 8/1985 | Jahnke et al. ............. 29/26 A |
| 4,712,282 A | | 12/1987 | Romeu |
| 4,797,989 A | | 1/1989 | Cherko |
| 4,955,770 A | * | 9/1990 | Kitamura ................. 409/134 |
| 5,172,464 A | * | 12/1992 | Kitamura et al. ........... 29/563 |
| 5,346,051 A | * | 9/1994 | Keith ..................... 198/346.1 |
| 5,678,291 A | | 10/1997 | Braun |
| 5,992,608 A | * | 11/1999 | Ahn ....................... 198/346.1 |
| 6,530,300 B2 | * | 3/2003 | Nakai et al. ................ 29/33 P |
| 6,632,054 B2 | * | 10/2003 | Geiger et al. .............. 29/33 P |
| 6,679,369 B2 | * | 1/2004 | Okuyama ................ 198/346.1 |
| 6,851,542 B2 | * | 2/2005 | Bernhard et al. ......... 198/346.1 |
| 6,948,894 B2 | * | 9/2005 | Taga et al. ................. 409/168 |

(Continued)

FOREIGN PATENT DOCUMENTS

DE  36 24 284 A1  2/1987

(Continued)

OTHER PUBLICATIONS

German Communication re Opposition filed against corresponding European Patent received Jul. 10, 2008.

*Primary Examiner*—Erica E Cadugan
(74) *Attorney, Agent, or Firm*—Browdy and Neimark, PLLC

(57) ABSTRACT

A cutting machine having a workpiece changer possessing a receiving element for the workpieces and/or workpiece palettes, said receiving element pivots about a vertical axis and is linearly shiftable in a plane normal to such axis. A tool spindle moves on two parallel side walls which are divided by a transverse wall or by door which can opened or shut between a front machining area and a rear supply area. The radius of the receiving element extends at least partly into a supply area and the tool spindle is movable over the front machining area. Accordingly a person minding or controlling the functioning cutting machine is not hampered by workpiece changing.

8 Claims, 3 Drawing Sheets

U.S. PATENT DOCUMENTS 7,013,544 B2 * 3/2006 Yasuda et al. ............... 29/33 P
2004/0079617 A1 * 4/2004 Bernhard et al. .......... 198/346.1

FOREIGN PATENT DOCUMENTS

| DE | 4441252 A1 | 5/1996 |
| DE | 94 22 019 U1 | 9/1997 |
| EP | 1 186 372 A1 | 3/2002 |
| EP | 1186371 A1 | 3/2002 |
| EP | 1321224 A1 | 6/2003 |
| EP | 1 747 843 A1 | 1/2007 |
| FR | 2 585 276 A2 | 1/1987 |
| JP | 62-84941 A | 4/1987 |

* cited by examiner

CUTTING MACHINE WITH A WORKPIECE CHANGER

BACKGROUND OF THE INVENTION

The invention relates to a cutting machine comprising a workpiece changer for shifting the workpieces and/or workpiece palettes to be processed between at least one transfer site outside the cutting machine, and a horizontally immobile workpiece table of the cutting machine, said workpiece changer possessing a receiving element for the workpieces and/or workpiece palettes, said receiving element being able to be pivoted about a vertical axis and to be linearly shifted in a plane normal to such axis, and a tool spindle arranged on a slide arrangement able to be power driven at least in the two horizontal directions.

THE PRIOR ART

In the case of such a cutting machine described in the U.S. Pat. No. 4,373,840 the supply of the workpiece palettes takes place from the front, that is to say from that side at which an operator controls and/or minds the machining operation. The operator therefore must leave his position during tool changing or risk exposing himself to danger. Moreover the prior art workpiece changer requires a large amount of space and even for this reason can only be employed for cutting machines, with which a wide passage is available for access to the workpiece table.

The European patent publication EP 1 186 371 A1 or EP 1 186 372 A1 has admittedly disclosed the principle of arranging a workpiece table on the rear side of a portal milling machine, but however this known arrangement involves a linear movement of the workpiece table of the machine toward the workpiece changer where it is loaded and unloaded. Such linearly moving workpiece tables are however not provided in the case of most types of cutting machines. Furthermore this known workpiece changer requires a large amount of space making it appear unsuitable for many applications.

SHORT SUMMARY OF THE INVENTION

Accordingly one object of the present invention is to provide a cutting machine with a non-horizontally moving workpiece table and a workpiece table, which as compared with prior art workpiece changers needs less room and in no way endangers the machine minder standing in front of the cutting machine.

In order to achieve these and/or other objects appearing from the present specification, claims and drawings, in the present invention the slide arrangement is adapted to run on two parallel side walls of the cutting machine designed in the form of a gantry machine, such side walls laterally delimiting a machining area and an intermediate space between the side walls is divided by a transverse wall or by a door, which during workpiece machining is closed and during the workpiece changing operation is at least partly open, into a front machining area and a rear supply area, the radius of pivoting of the receiving element, engaging a workpiece or a workpiece palette, extending at least partly into the supply area.

The advantages of the cutting machine in accordance with the invention having a workpiece changer are more especially that its pivotal receiving element for workpieces and/or workpiece palettes may swing into the machine's inner space defined by two side walls of the cutting machine designed in the form of a gantry machine so that the additional need for space outside for the workpiece changer may be correspondingly smaller. In an advantageous manner in this case such inner space or, respectively, intermediate space between the side walls is subdivided by a transverse wall, able to be opened, or door into two areas, namely a front machining area and a rear supply area for the workpiece changer. With the transverse wall or door open the linearly moving receiving element may be shifted as far as the workpiece table, where it may dump or pick up the workpiece or the workpiece palette. During the machining operation on workpieces the transverse wall or, respectively, the door is closed and the workpiece changer does not in any way hinder the machining operation or endanger the machine minder.

In the claims measures are defined as advantageous further developments and improvements for the cutting machine in accordance with the invention.

The workpiece changer is preferably provided with a lifting means for the receiving element in order to lift and put down workpieces or workpiece palettes in a rational fashion.

In accordance with an advantageous feature for the linear movement of the receiving element such element is arranged on a guide rail or on a telescopic arm, the guide rail or the telescopic arm preferably partaking in pivotal movement about the vertical axis. The pivotal co-entrainment is however an optional but also advantageous feature.

The workpiece changer may be positioned as a separate arrangement on the cutting machine or may be fitted thereto as an integral arrangement.

The receiving element may advantageously be in the form of a single gripper or as a double gripper. In the case of the design as a double gripper a simple pivotal motion may serve to simultaneously remove a palette of machined workpieces from the workpiece table and to supply a palette of workpieces yet to be machined.

The workpiece table may be in the form of an immobile workpiece table or as a pivotal one, whose axis of pivoting is preferably defined by an axle bearinged in or on the two side walls. Vertical mobility of the workpiece table is also possible without impairing the basic principle of the invention.

The transfer site can be in the form of a preferably rotatable set-up table or as a transfer station of a workpiece feed means or an external workpiece or palette magazine. The transfer site is in this case preferably decoupled from the workpiece changer so that interfering effects or vibrations, due for example to the set-up and shut-down of the set-up site are not transmitted to the workpiece changer or, respectively, the machine frame.

The slide arrangement of the tool spindle preferably also has a vertical drive to shift it.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
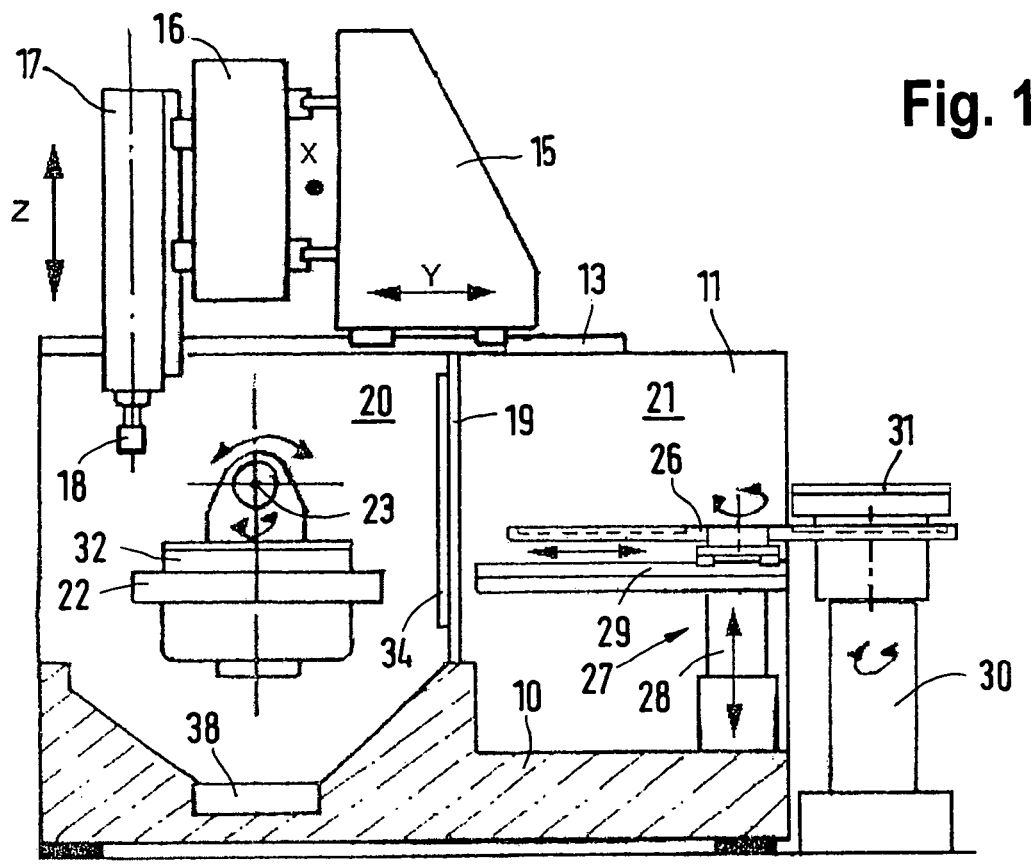
FIG. 1 is a side elevation of a cutting machine having an integrated workpiece changer with one side wall cut away for better visibility, as a first embodiment of the invention
Figure 2:
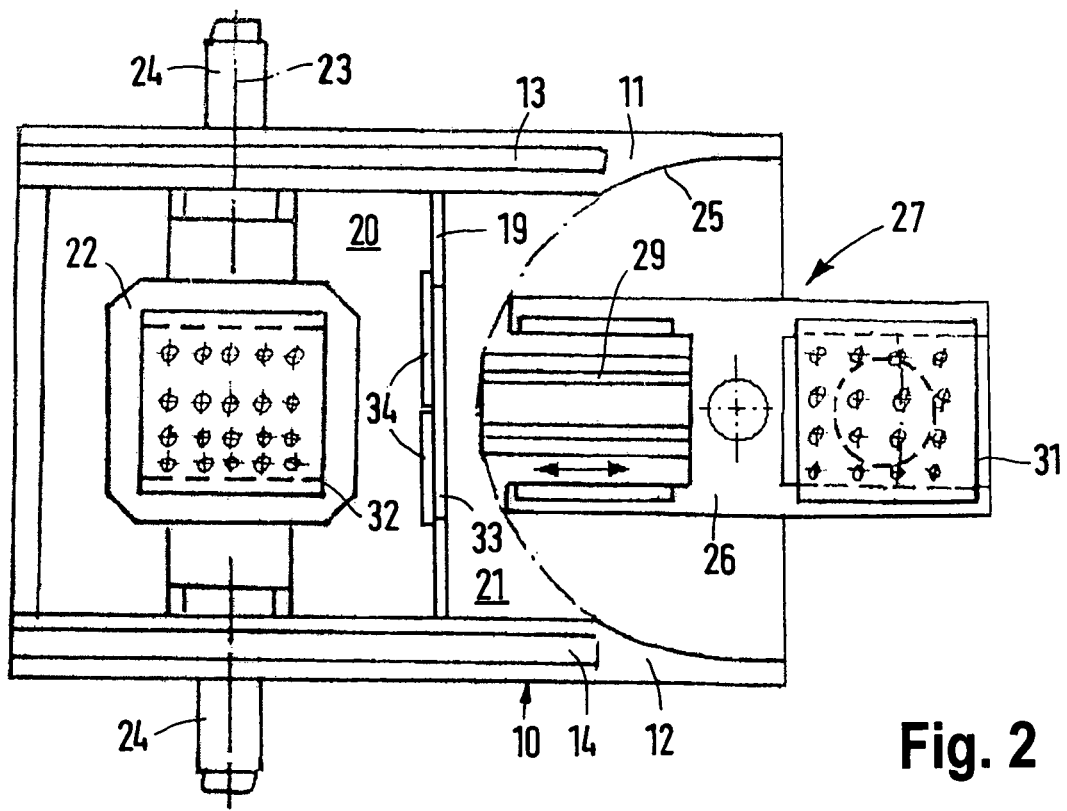
FIG. 2 shows the same cutting machine in a plan view.

The cutting machine illustrated in FIGS. 1 and 2 as a first working example is designed in the form of a gantry machine and serves more particularly to mill and/or drill workpieces. The cutting machine possesses a bed 10 having two upright parallel and spaced apart side walls 11 and 12. On these side walls guide rails 13 and 14 are arranged for the guidance of a power driven longitudinal slide 15 able to move in the horizontal longitudinal direction Y. On this longitudinal slide 15 a transverse slide 16 runs for power driven motion in the horizontal X direction. On the transverse slide 16, in turn, a power driven tool spindle 17 is able to be shifted in the vertical Z direction and serves to drive tools 18 in rotation, which can be held in it in a interchangeable manner. A laterally arranged workpiece changer is omitted from the drawing for simplification.

The area between the side walls 11 and 12 is divided up by transverse wall 19 into a front machining area 20 and a rear supply area 21 for workpieces. In the front machining area 20 a workpiece table 22 designed to act as a pivotal table is pivotally or rotatably supported in the two side walls 11 and 12. The axis of pivoting 23 runs in this case normally to the longitudinal direction of the side walls 11 and 12. The pivotal motion is caused by two drive motors 24 arranged on the outer sides of the side walls 11 and 13, a single drive motor 24 mounted on one side also being sufficient. The workpiece table 22 may additionally be pivoted about an axis perpendicular to the pivot axis 23, the power or motor drive being able to be arranged directly on the workpiece table 22 or on the outer sides of the side walls 11 and 12. Such an arrangement is for example disclosed in the German patent publications 4,441,252 A. In this case the workpiece table 22 may be replaced or, respectively, interchanged using other pivoting workpiece holding means and it is possible too as an alternative or in addition to arrange a stationary workpiece table in the machining area 20.

Into the rear supply area 21 there extends the pivot radius 25 of a double gripper 26 of a workpiece changer 27, such double gripper 26 being adapted to turn about a vertical axis and being holding a workpiece or a workpiece palette (31 and 32). In the working embodiment illustrated the workpiece palette 32 is located within the double gripper 26 so that the pivot axis of the double gripper 26 is relevant as the major radius. In the case of the workpiece palette 31 its overlapping pivotal radius is relevant as the major radius. The workpiece changer has a lifting means 28 on which a linear guide means 29 is arranged for horizontal linear guidance of the double gripper. The workpiece changer 27 or, respectively, the lifting means 28 is in this case mounted on the machine bed 10.

Adjacent to the machine as a separate means a set-up table 30 is arranged for preparing workpieces or workpiece palettes 31 prior to processing by the cutting machine and for fettling same following machining. In this case workpiece palettes 31 and/or workpieces are, for example, positioned, mounted, cleaned and the like. As shown in the figures the double gripper 26 is in a travelling position, in which one of its two grippers is positioned underneath a prepared workpiece palette 31 on the set-up table 30. Accordingly a lifting movement then takes place, by which the workpiece palette 31 is lifted from the set-up table. Now the double gripper 26 is shifted on the linear guide means 29, to a workpiece palette 32, which is located on the workpiece table 22 and which has already been processed. The transverse wall 19 possesses a suitable passage opening 33, which is closed by two pivoting or sliding doors 34 during the machining operation. For tool changing the pivotal or sliding doors 34 open and the double gripper 26 may therefore shift its second, non-loaded gripper underneath the workpiece palette 32 on the workpiece table 22. By a lifting operation this workpiece palette 32 is raised after proper unlocking and the double gripper 26 again travels into the position illustrated in FIGS. 1 and 2. By pivoting through 180 degrees, naturally above the set-up table 30, the two workpiece palettes 31 and 32 are exchanged in position and the processed palette may be dumped on the set-up table 30 for fettling, whereas the as yet unworked palette 22 is moved to the workpiece table 22 where it is put down by lowering the workpiece palette 31.

As a modification of the illustrated working embodiment the double gripper 26 can be also designed in the form of a single gripper so that the number of working sequences on workpiece changing or, respectively, palette changing is increased. Moreover, a smaller pivot radius 25 may be designed for so that the workpiece changer 27 is able to be shifted farther between the side walls 11 and 12.

As an alternative to a receiving element in the form of such a gripper or one provided with a receiving element, such element it is possible as well to provide a receiving element provided with coupling elements for coupling up with workpieces or workpiece palettes 31 and 32, as is for example disclosed in the European patent publication EP 1 321 224 A1. In this case the radius of pivot of the coupled on workpieces or of the coupled on workpiece palettes 31 and 32 is the determining factor.

In the case of the workpiece changer 27 it is important for the double gripper 26, or possibly a single gripper, to be able to perform a pivotal movement and a linear movement. This can for example be made possible if the lifting means 28 including the double gripper 26 is able to travel along a guide path on the machine bed 10.

The set-up table 30 can also be designed to pivot about a vertical axis in order to be able to perform the positioning of the workpieces or, respectively, the workpiece palettes in an optimum fashion. Instead of the set-up table 30 a different transfer site may be provided clear of the cutting machine, for example the transfer site of a workpiece or workpiece palette supply means or the transfer site of an external palette magazine. A set-up table 30 may then be provided in addition.

To the extent that in lieu of the pivoting workpiece table 22 as illustrated a workpiece tale is to be provided able to travel along a vertical axis, the requirement for vertical mobility of tool spindle 17 may be dropped.

Figure 3:
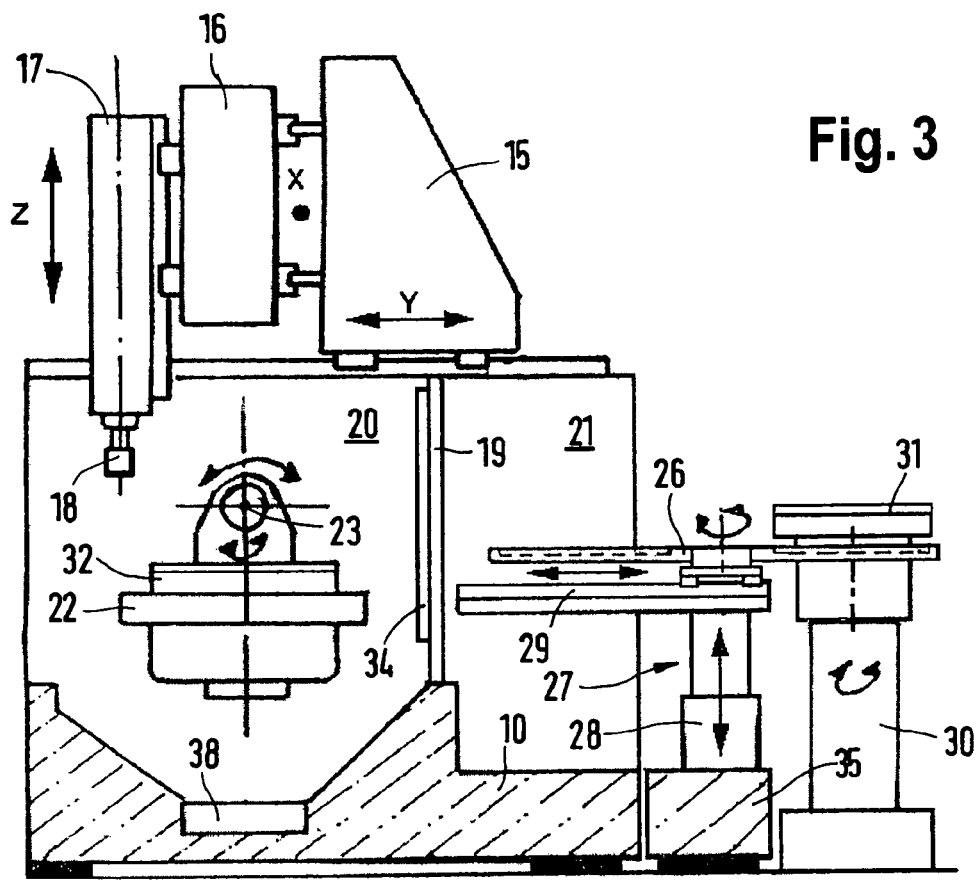
FIG. 3 shows a cutting machine with a separately fitted workpiece changer in a lateral elevation similar that of FIG. 1, as a second embodiment of the invention.
Figure 4:
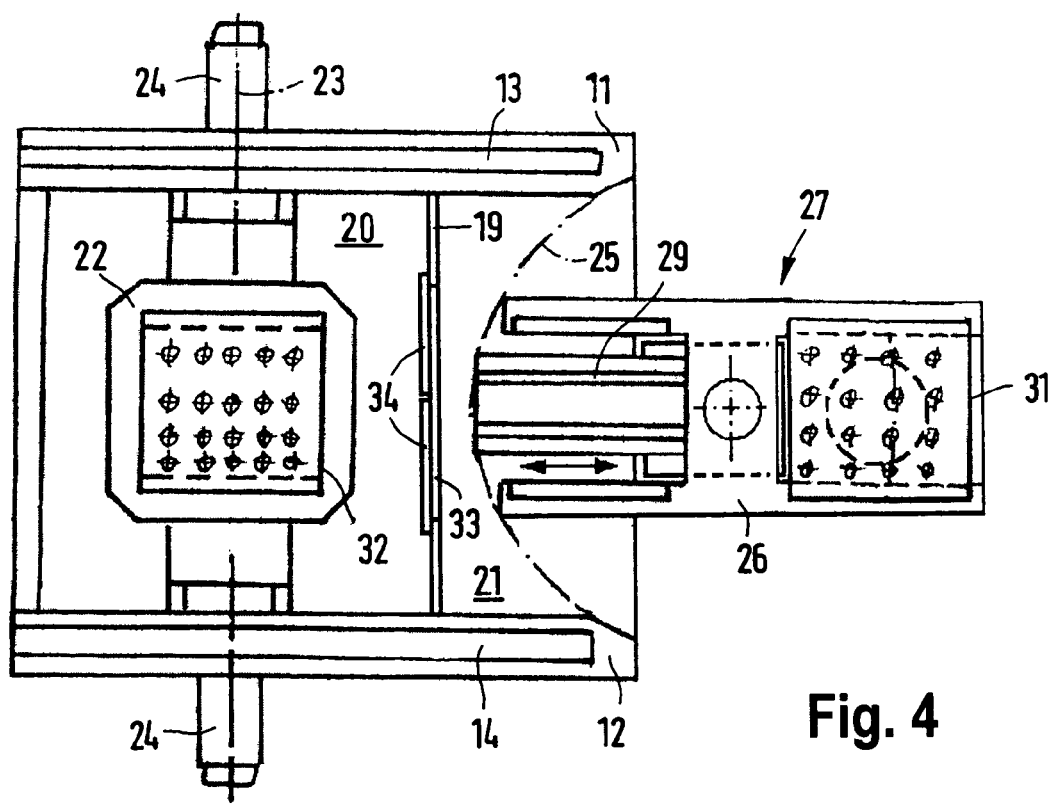
FIG. 4 is a plan view of the cutting machine in accordance with FIG. 3.

In the second working embodiment illustrated in FIGS. 3 and 4 similar or functionally similar component and groups thereof have the same reference numerals and are not described again in detail. The difference between the first and second embodiments is that the workpiece changer 27 in the second one is now not mounted on the machine bed 10 and has its own base frame 35 and is positioned directly adjacent to the cutting machine as a separate means.

Figure 5:
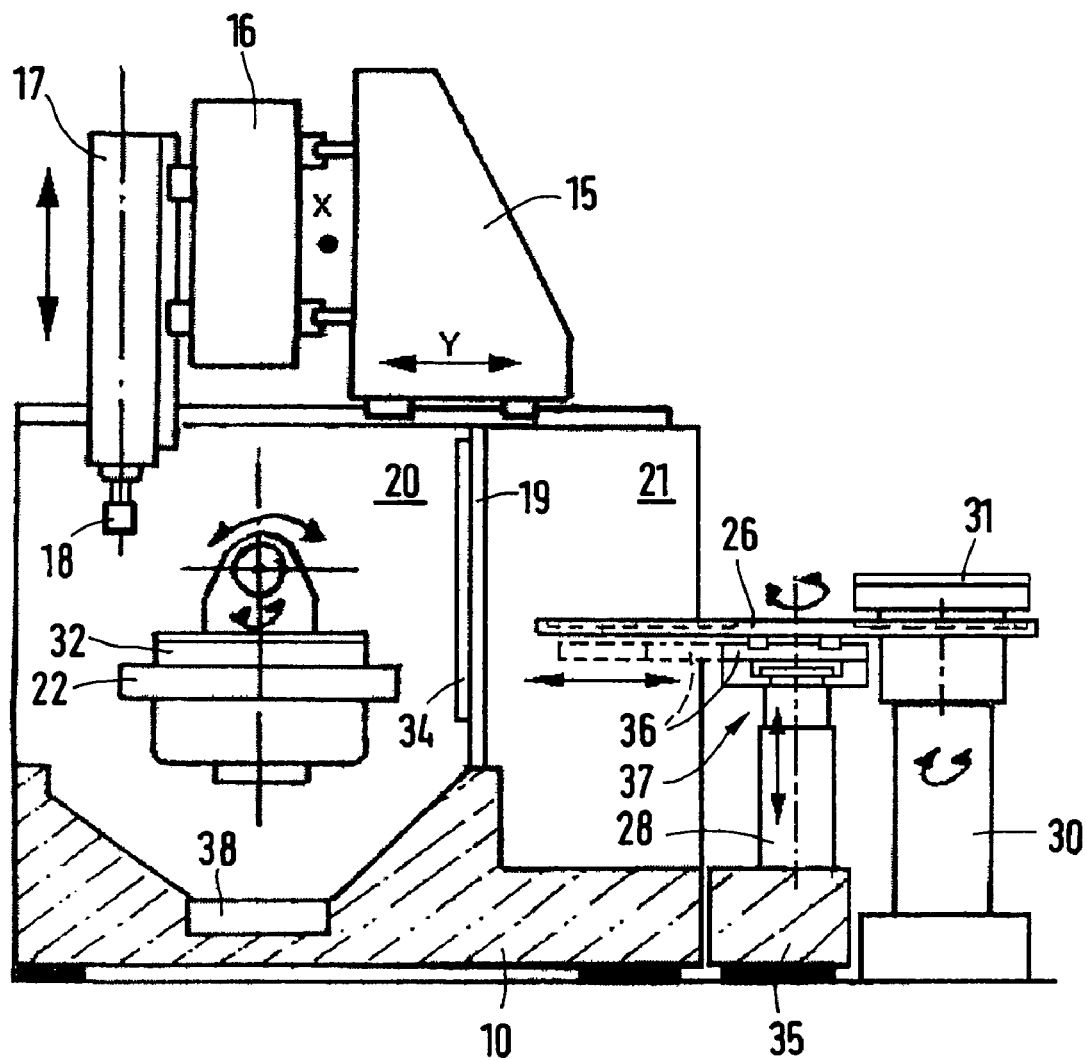
FIG. 5 shows a cutting machine whose workpiece changer is modified to depart from the design of FIG. 3, as a third embodiment of the invention.

In the case of the third working embodiment depicted in FIG. 5 similar or functionally similar components and groups thereof have the same reference numerals and are not described again in detail. Differing from the working examples described so far the double gripper 26 is not arranged to travel along a guide element constituting the linear guide means, and instead is in the form of a modified linear guide means 36 as a telescoping arm, defining the path of motion of the double gripper. In contradistinction to the linear guide means 29 in accordance with the two first working examples, this telescopic arm can also pivot and partake in the pivoting motion of the double gripper 26.

In the case of the third working embodiment the workpiece changer 37 according to the second embodiment, adapted in the manner described, is designed in the form of a separate means. However this workpiece changer 37 could also be mounted as in the first embodiment on the machine bed 10.

In all working examples the machine bed 10 is shaped so as to conically taper downward in the portion underneath the cutting portion 20 so that a chute for shavings leading to a shavings removal means 38 is formed for example in the form of a conveyor belt. While not illustrated in the drawings, suitable oblique faces of side walls also could extend to the shavings removal means 38.

A machine operator standing on the front side before the cutting portion 20 minding or operating the machine does not have to leave his position for tool or palette changing, since the workpiece changer 27 or, respectively, the means charging workpieces performs its task from the rear side of the machine.

The invention claimed is:

1. A cutting machine comprising:
    a workpiece changer for shifting workpiece palettes to be processed between at least one transfer site outside the cutting machine and a horizontally immobile workpiece table of the cutting machine,
    said workpiece changer possessing a receiving element for receiving the workpiece palettes,
    said receiving element being pivotally mounted so as to be pivotal about a vertical axis and also mounted so as to be linearly shiftable in a plane normal to the vertical axis, and
    a tool spindle arranged on a slide arrangement power driven at least in two horizontal directions,
    wherein the slide arrangement moves horizontally on two parallel planar side walls along the length of the cutting machine designed in the form of a gantry machine,
    the side walls laterally delimiting a front machining area and a rear supply area which are divided by a transverse wall or by a door engaged between the side walls,
    wherein during workpiece machining the transverse wall or the door is closed and during the workpiece changing operation the transverse wall or the door is at least partly open, between the front machining area and the rear supply area, and
    wherein a radius of pivoting of the receiving element which engages a workpiece palette-extends at least partly into the supply area between the side walls, and
    wherein the receiving element is configured to be linearly movable into the front machining area to transfer the workpiece palette from the receiving element to the workpiece table and to withdraw from the front machining area to the rear supply area during the machining operation.

2. The cutting machine as set forth in claim 1, wherein the workpiece changer is provided with a lifting means for the receiving element.

3. The cutting machine as set forth in claim 1, wherein for the linear shifting, the receiving element is arranged on a rail guide or a telescopic arm, wherein the telescopic arm is able to partake in the pivoting movement of the receiving element about the vertical axis.

4. The cutting machine as set forth in claim 1, wherein the workpiece changer is positioned adjacent the cutting machine as a separate arrangement or is fixed on the cutting machine as an integral arrangement.

5. The cutting machine as set forth in claim 1, wherein the receiving element is in the form of a double gripper.

6. The cutting machine as set forth in claim 1, wherein the workpiece table is in the form of a pivoting workpiece table, with a pivot axle engaged in or on the two side walls.

7. The cutting machine as set forth in claim 1, wherein the at least one transfer site is in the form of a rotatable set-up table.

8. The cutting machine as set forth in claim 1, wherein the slide arrangement of the tool spindle also possesses a vertical motion drive.

\* \* \* \* \*